(12) United States Patent
Shibata

(10) Patent No.: US 11,465,672 B2
(45) Date of Patent: Oct. 11, 2022

(54) STEERING DEVICE

(71) Applicant: NSK LTD., Tokyo (JP)

(72) Inventor: Tsutomu Shibata, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/431,817

(22) PCT Filed: Feb. 8, 2021

(86) PCT No.: PCT/JP2021/004590
§ 371 (c)(1),
(2) Date: Aug. 18, 2021

(87) PCT Pub. No.: WO2021/215078
PCT Pub. Date: Oct. 28, 2021

(65) Prior Publication Data
US 2022/0097755 A1    Mar. 31, 2022

(30) Foreign Application Priority Data

Apr. 21, 2020 (JP) .............. JP2020-075728

(51) Int. Cl.
*B62D 5/04* (2006.01)
*B62D 6/00* (2006.01)

(52) U.S. Cl.
CPC ........... *B62D 5/0409* (2013.01); *B62D 6/002* (2013.01)

(58) Field of Classification Search
CPC .............................. B62D 5/0409; B62D 6/002
USPC ......................................................... 701/42
See application file for complete search history.

(56) References Cited

U.S. PATENT DOCUMENTS

| 8,406,956 | B2 | 3/2013 | Wey et al. |
| 2016/0009318 | A1 | 1/2016 | Morotomi et al. |
| 2017/0039855 | A1* | 2/2017 | Maeda ............... B60W 30/143 |
| 2017/0190354 | A1 | 7/2017 | Ko |
| 2017/0232889 | A1* | 8/2017 | Miura ................... B60W 10/20 |
| | | | 340/441 |
| 2017/0253266 | A1* | 9/2017 | Minamiguchi ........ B62D 6/008 |

(Continued)

FOREIGN PATENT DOCUMENTS

| BR | 112019014995 A2 * | 4/2020 | ............. B62D 5/046 |
| DE | 102017211068 A1 * | 1/2018 | ............... B62D 1/04 |

(Continued)

OTHER PUBLICATIONS

Nai et al., "Active Torque Control of Electric Power Steering System Using Composite Nonlinear Feedback Control," 2015, Publisher: IEEE.*

(Continued)

*Primary Examiner* — Tuan C To
(74) *Attorney, Agent, or Firm* — Sughrue Mion, PLLC

(57) ABSTRACT

A steering device includes a motor that assists or performs steering, and a controller that controls the motor. The controller receives a steering request for a plurality of assistance functions, selects a driving assistance function to be operated at the same time from the driving assistance functions for which the steering request was made, calculates a command value for the motor for each of the selected driving assistance function, adjusts the command value based on a combination of the selected driving assistance function, and calculates a final command value for the motor using the adjusted command value.

13 Claims, 10 Drawing Sheets

(56) References Cited

U.S. PATENT DOCUMENTS

| | | | |
|---|---|---|---|
| 2018/0029633 A1 | 2/2018 | Tsubaki | |
| 2018/0362073 A1* | 12/2018 | Hirate | B62D 15/0285 |
| 2019/0210649 A1* | 7/2019 | Sahaya | B62D 15/025 |
| 2019/0322311 A1* | 10/2019 | Aoki | B62D 6/008 |
| 2020/0070873 A1 | 3/2020 | Itabashi | |
| 2020/0114961 A1* | 4/2020 | Suzuki | B62D 5/003 |
| 2020/0324808 A1* | 10/2020 | Kodera | B62D 6/007 |
| 2021/0031827 A1* | 2/2021 | Karve | B62D 5/006 |
| 2021/0387632 A1* | 12/2021 | Sugawara | B60W 60/0053 |

FOREIGN PATENT DOCUMENTS

| | | | | |
|---|---|---|---|---|
| EP | 2495156 A1 | | 9/2012 | |
| EP | 3641126 A1 * | | 4/2020 | B62D 5/046 |
| JP | 2014213779 A * | | 11/2014 | |
| JP | 2019098964 A * | | 6/2019 | |
| JP | 2020-032856 A | | 3/2020 | |
| JP | 6678739 B2 * | | 4/2020 | B60T 13/74 |
| WO | 2014/155615 A1 | | 10/2014 | |
| WO | WO-2019087866 A1 * | | 5/2019 | B62D 15/021 |

OTHER PUBLICATIONS

Johannes et al., "Stabilization of Automotive Vehicles Using Active Steering and Adaptive Brake Control Allocation," 2010, vol. 18, Publisher: IEEE.*

Written Opinion for PCT/JP2021/004590, dated Apr. 20, 2021.

International Search Report for PCT/JP2021/004590, dated Apr. 20, 2021.

European Search Report dated Feb. 9, 2022 in Application No. 21751739.0.

* cited by examiner

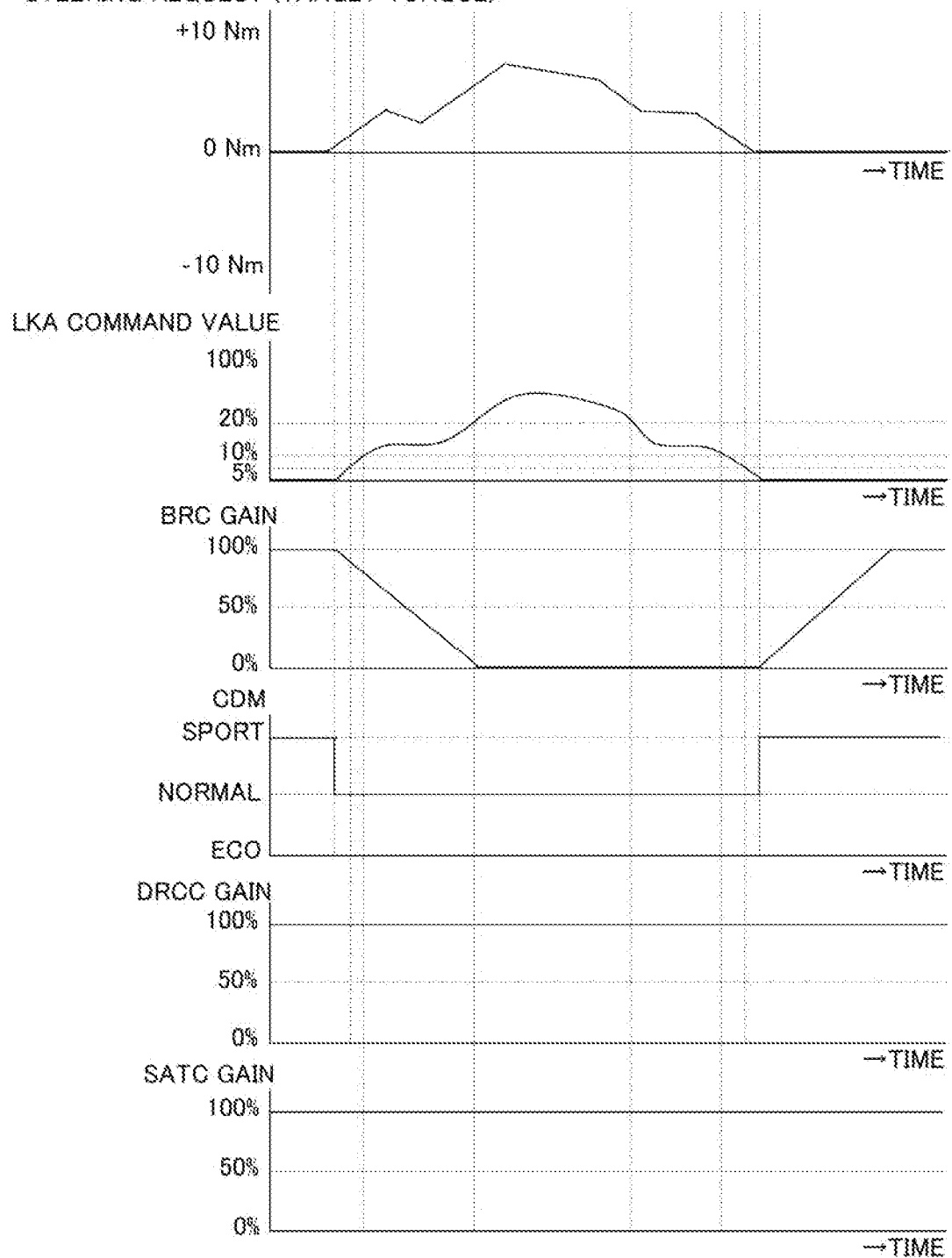

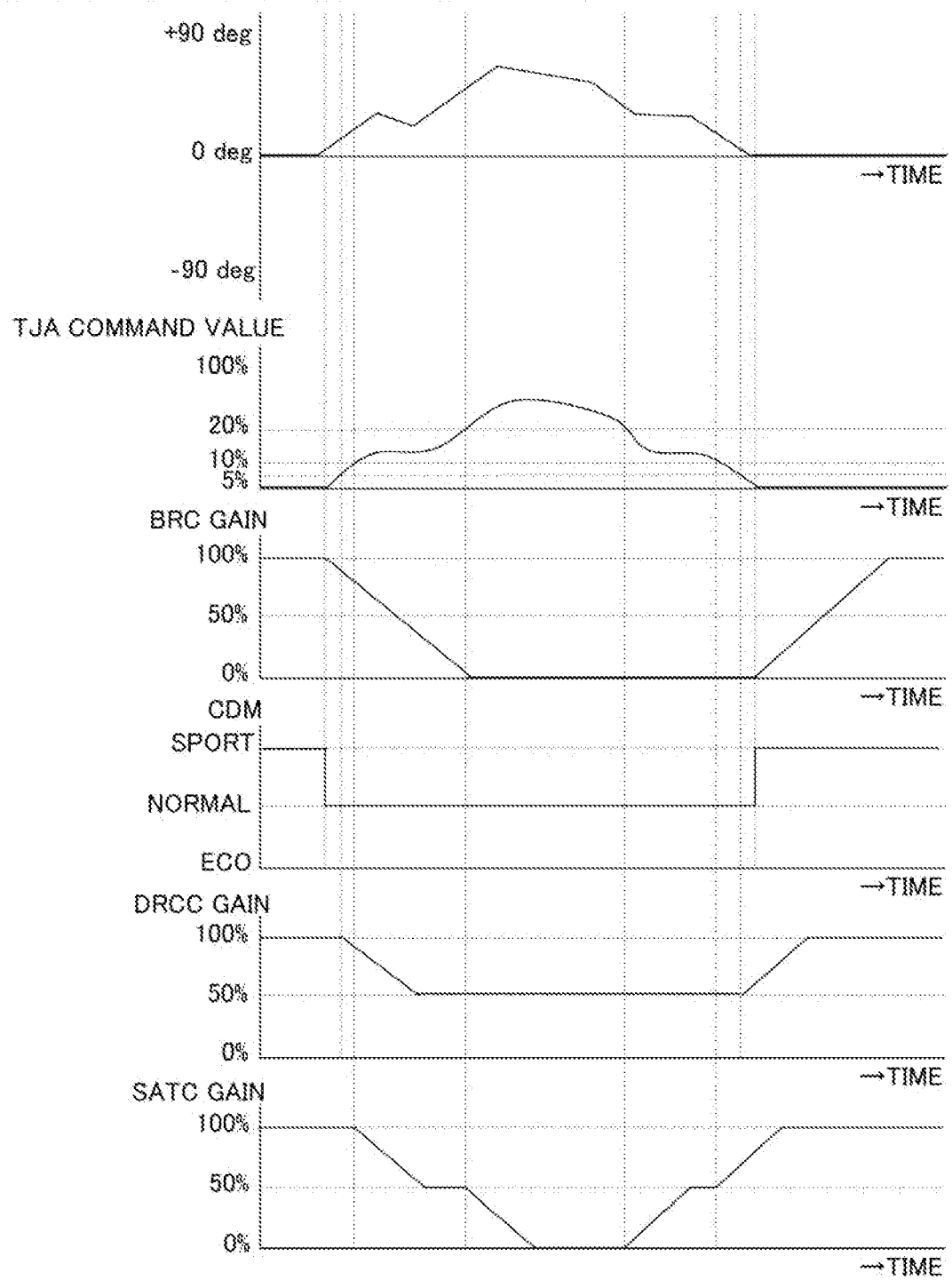

STEERING DEVICE

CROSS REFERENCE TO RELATED APPLICATIONS

This application is a National Stage of International Application No. PCT/JP2021/004590 filed Feb. 8, 2021, claiming priority based on Japanese Patent Application No. 2020-075728 filed Apr. 21, 2020, the contents of which are incorporated herein by reference.

TECHNICAL FIELD

The present invention relates to a steering device such as a power steering device.

BACKGROUND ART

The power steering device has a number of steering feeling improving functions such as driving track convergence control and self-alignment torque compensation, in addition to a steering assistance function that reduces the load on the driver by motor power.

In recent years, vehicles equipped with automatic driving functions such as parking assistance, lane keeping assistance, and traffic jam driving assistance have been developed. The power steering device mounted on the vehicle equipped with the automatic driving function needs to operate without interfering with the driving assistance functions such as the steering feeling improving function and the automatic driving function.

The steering system control device described in Patent Document 1 arbitrates the steering request directed to the steering system according to the driving situation based on the priority. When a plurality of driving assistance functions are requested at the same time, the steering system control device described in Patent Document 1 selects and starts one of the driving assistance functions based on the priority.

PRIOR ART DOCUMENTS

[Patent Document]
[Patent Document 1]
  U.S. Pat. No. 8,406,956

SUMMARY OF THE INVENTION

Problems to be Solved by the Invention

However, the steering system control device described in Patent Document 1 can arbitrate and exclusively operate a plurality of driving assistance functions based on priority, but cannot operate a plurality of driving assistance functions at the same time in a coordinated manner.

Based on the above circumstances, it is an object of the present invention to provide a steering device capable of coordinating and operating a plurality of driving assistance functions.

Means for Solving the Problems

In order to solve the above problems, the present invention proposes the following means.

The steering device according to the first aspect of the present invention includes a motor that assists or performs steering, and a controller that controls the motor. The controller receives a steering request for a plurality of assistance functions, selects a driving assistance function to be operated at the same time from the driving assistance functions for which the steering request was made, calculates a command value for the motor for each of the selected driving assistance functions, adjusts the command value based on a combination of the selected driving assistance function, and calculates a final command value for the motor using the adjusted command value.

Effect of the Invention

According to the steering device of the present invention, a plurality of driving assistance functions can be operated in a coordinated manner.

BRIEF DESCRIPTION OF THE DRAWINGS

FIG. 13 is a command value adjustment amount output by the command value adjusting module based on the command value output by a driving assistance subsystem LKA of the power steering device.

FIG. 14 is a command value adjustment amount output by the command value adjusting module based on the command value output by a driving assistance subsystem TJA of the power steering device.

PREFERRED EMBODIMENTS FOR CARRYING OUT THE INVENTION

First Embodiment

A first embodiment of the present invention will be described with reference to FIGS. 1 to 11.

Figure 1:
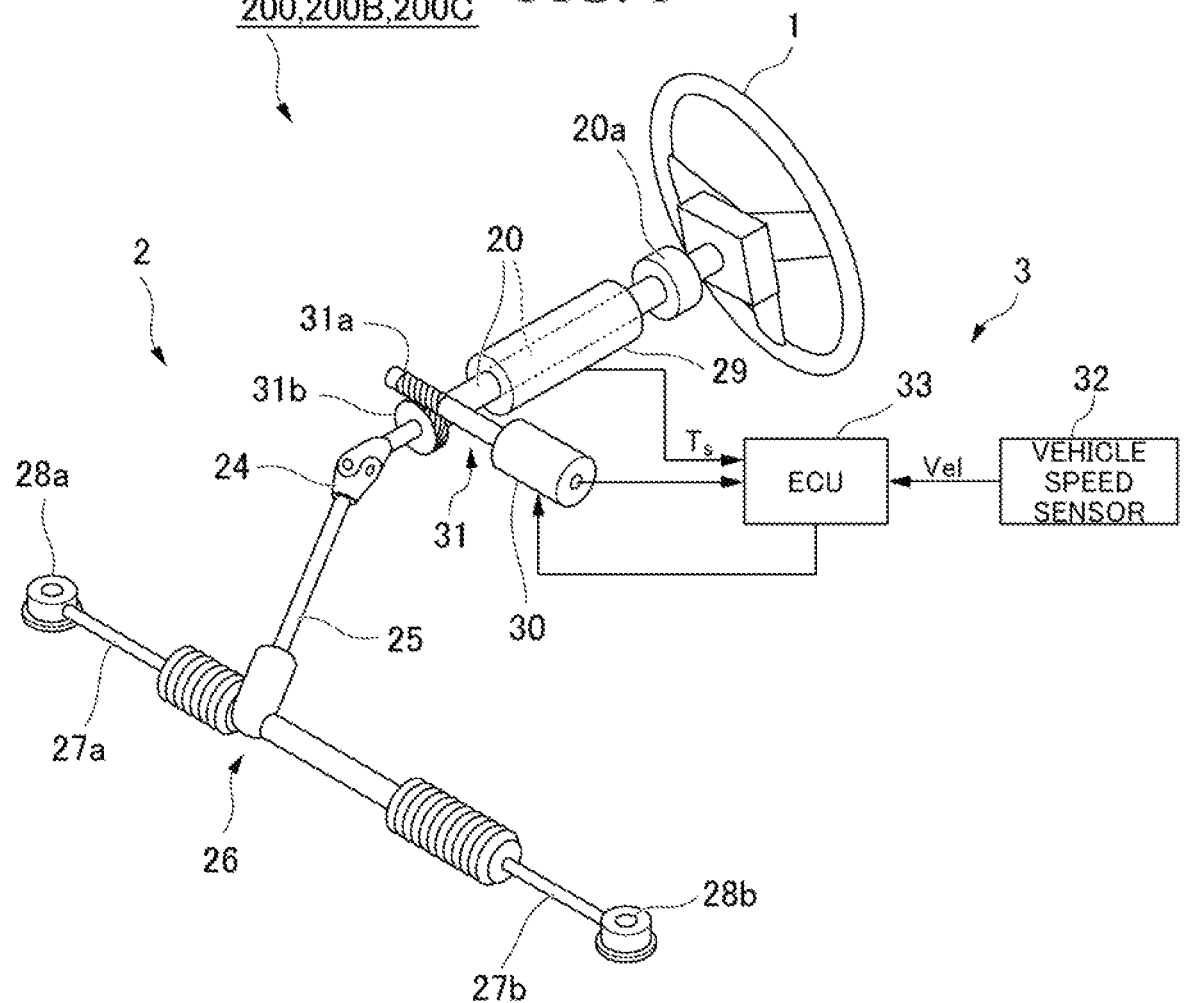
FIG. 1 is a schematic view showing a configuration of a power steering device according to a first embodiment of the present invention.

FIG. 1 is a schematic view showing a configuration of a power steering device 200 according to the present embodiment. The power steering device 200 is a column assist type electric power steering device in which an electric motor and a reduction mechanism are arranged on a column portion (steering shaft).

[Power Steering Device (Steering device) 200]

As shown in FIG. 1, the power steering device (steering device) 200 includes a steering wheel 1 that is a steering member for steering a vehicle, a steering mechanism 2 that steers the steering wheels in conjunction with the rotation of the steering wheel 1, and a steering assistance mechanism 3 that assists the steering of the driver.

The steering mechanism 2 includes a steering shaft (column shaft, steering wheel shaft) 20 connected to the steering wheel 1, a steering angle sensor 20a that detects the steering angle of the steering wheel 1, a universal joint 24, an intermediate shaft 25, a pinion rack mechanism 26, tie rods 27a and 27b, and hub units 28a and 28b.

The steering shaft 20 is connected to the steering wheel via the universal joint 24, the intermediate shaft 25, the pinion rack mechanism 26, the tie rods 27a and 27b, and further via the hub units 28a and 28b. The steering shaft 20 is provided with a torque sensor 29. The torque sensor 29 is used to calculate the steering torque (steering torque) Ts.

The pinion rack mechanism 26 has a pinion and a rack (not shown in the figure).

The pinion is connected to the intermediate shaft 25 and rotates in conjunction with the rotation of the intermediate shaft 25.

The rack extends linearly along the left-right direction (direction orthogonal to the straight-ahead direction) of the automobile. The rack meshes with the pinion near the axial middle of the rack. The pinion and rack translate the rotation of the pinion into the axial movement of the rack. Steering wheels are steered by moving the rack in the axial direction.

When the steering wheel 1 is steered (rotated) by the driver, the rotation of the steering wheel 1 is transmitted to the pinion via the steering shaft 20 and the intermediate shaft 25. Then, the rotation of the pinion is converted into the axial movement of the rack. The tie rods 27a and 27b and the hub units 28a and 28b connected to both ends of the pinion rack mechanism 26 move in the axial direction of the rack, and the steering wheels connected to the hub units 28a and 28b are steered.

As shown in FIG. 1, the steering assistance mechanism 3 includes an electric motor 30, a reduction mechanism 31, a vehicle speed sensor 32 that detects vehicle speed, and an ECU (controller) 33.

The electric motor 30 is an electric motor that assists the steering force of the steering wheel 1, and is, for example, a three-phase brushless motor. The electric motor 30 is connected to the steering shaft 20 via the reduction mechanism 31.

The reduction mechanism 31 includes a worm gear mechanism having a worm 31a and a worm wheel 31b that meshes with the worm 31a. The worm 31a is rotationally driven by the electric motor 30. Further, the worm wheel 31b is integrally rotatably connected to the steering shaft 20. The worm wheel 31b is rotationally driven by the worm 31a.

The vehicle speed sensor 32 is a sensor that detects the vehicle speed Vel. The vehicle speed sensor 32 outputs the detected vehicle speed Vel to the ECU 33.

Figure 2:
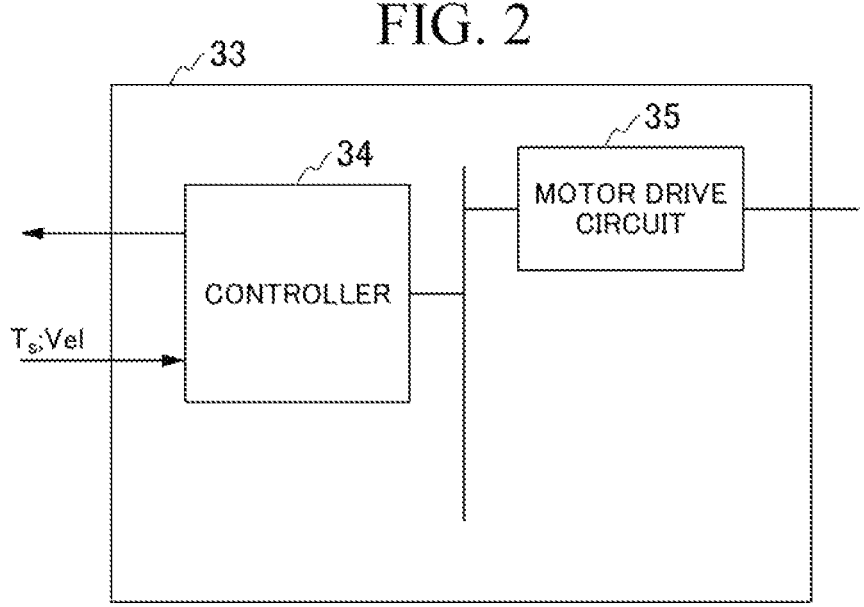
FIG. 2 is a block diagram showing a configuration of an ECU of the power steering device.

FIG. 2 is a block diagram showing the configuration of the ECU 33.

As shown in FIG. 2, the ECU (controller) 33 includes a controller 34 and a motor drive circuit 35.

Figure 3:
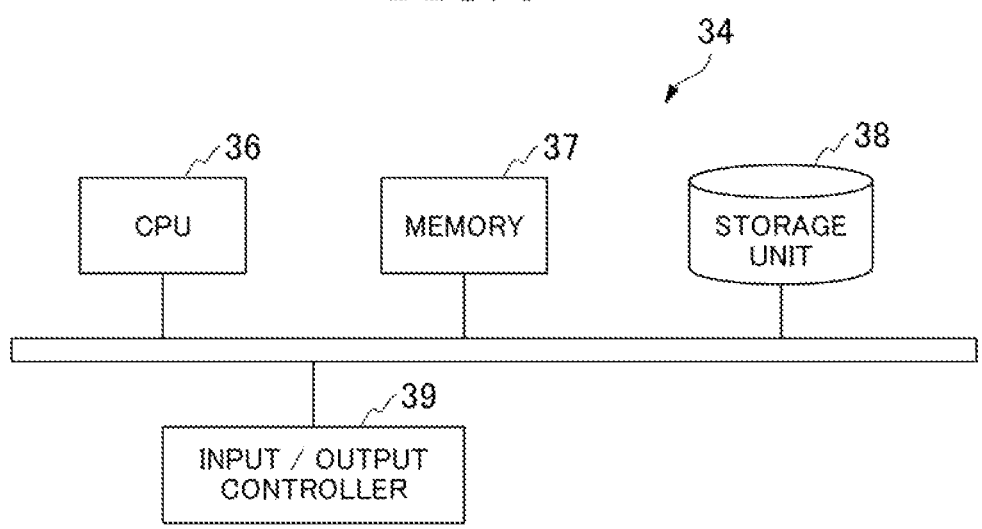
FIG. 3 is a block diagram showing a configuration of a controller of the ECU.

FIG. 3 is a block diagram showing a configuration of the controller 34.

As shown in FIG. 3, the controller 34 is a program-executable device (computer) including a CPU (Central Processing Unit) 36, a memory 37, a storage unit 38, and an input/output controller 39. By executing a predetermined program, it functions as a plurality of functional blocks such as a motor control module 120 described later. At least a part of the functions of the controller 34 may be configured by a dedicated logic circuit or the like.

The storage unit 38 is a non-volatile recording medium that stores the above-mentioned program and necessary data. The storage unit 38 is composed of, for example, a ROM, a hard disk, or the like. The program recorded in the storage unit 38 is read into the memory 37 and executed by the CPU 36.

The input/output controller 39 receives input data from the vehicle speed sensor 32, the rotation angle sensor of the electric motor 30, the external vehicle system, and the like. Further, when the CPU 36 controls the vehicle speed sensor 32 and the electric motor 30, the input/output controller 39 generates a control signal for the vehicle speed sensor 32 and the electric motor 30 based on an instruction of the CPU 36.

The motor drive circuit 35 is an inverter or the like that drives the electric motor 30. The motor drive circuit 35 uses, for example, a FET (field effect transistor) as a drive element, and is composed of a bridge circuit of the FET. Further, the motor drive circuit 35 includes a motor current detection circuit.

Figure 4:
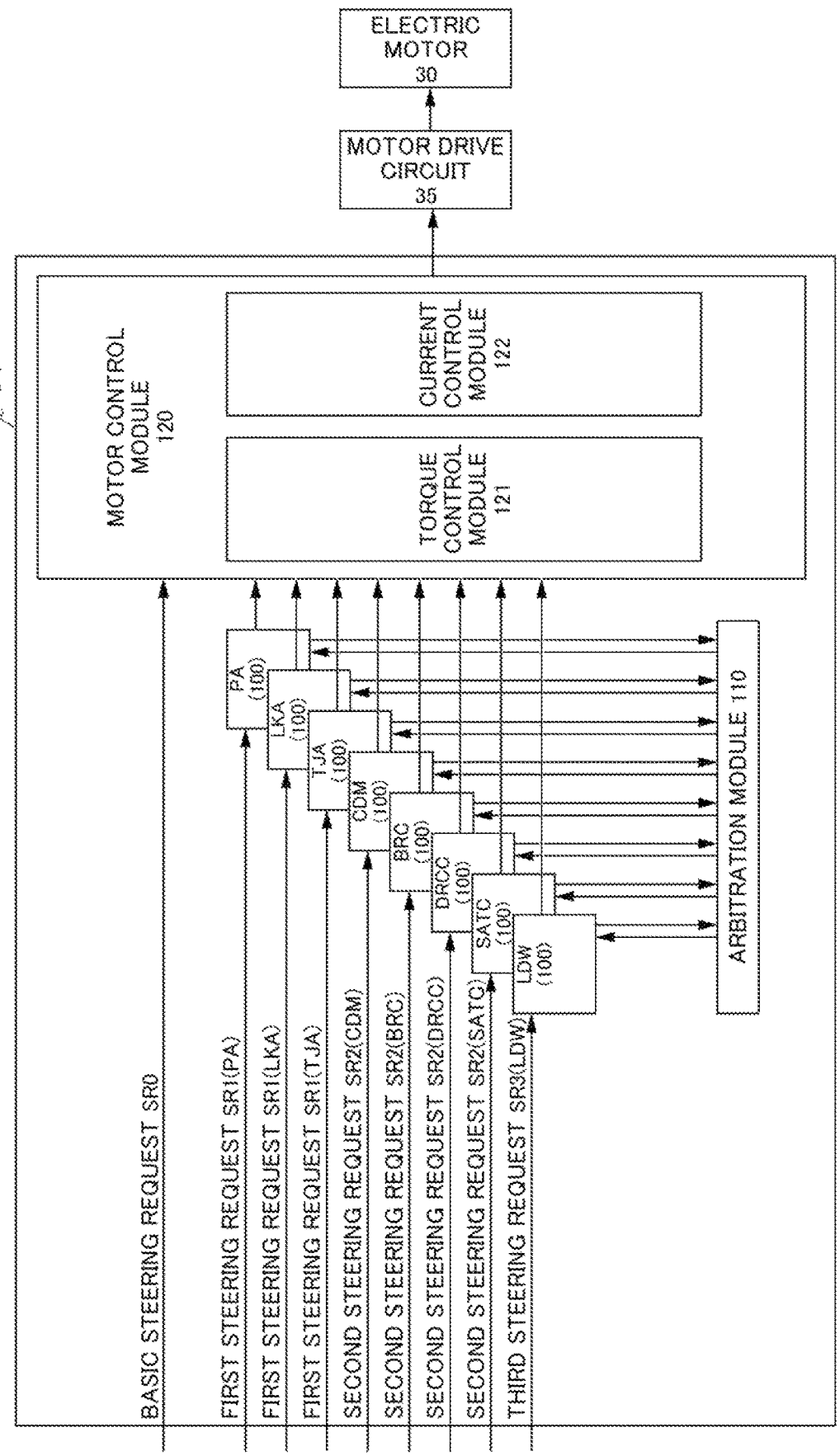
FIG. 4 is a functional block diagram of the controller.

FIG. 4 is a functional block diagram of the controller 34.

The controller 34 receives steering requests related to a plurality of driving assistance functions. The steering request is a control request related to steering such as steering angle and steering torque. The controller 34 receives a basic steering request SR0 related to the steering assistance function, a first steering request SR1 related to a function belonging to the automatic driving function group (first function group), a second steering request SR2 related to a function belonging to the steering feeling improving function group (second function group), and a third steering request SR3 related to other functions.

The controller 34 receives the relevant parameters along with the steering request. The parameters relate to a function corresponding to a steering requirement, for example, a target steering angle, an additional torque amount, a vehicle speed, a wheel speed, a steering angle, a steering angular velocity, a steering vibration pattern, an operation mode, and the like.

The functional block of the controller 34 includes a driving assistance subsystem 100 that receives steering requests (SR1, SR2, SR3) other than the basic steering request SR0, an arbitration module 110, and a motor control module 120. The basic steering request SR0 is directly received by the motor control module 120.

The steering assistance function is a basic function of the power steering device 200 that assists the steering of the operator. The controller 34, which has received the steering request by the steering assistance function, calculates a current command value of an assist (steering assistance) command based on the steering torque Ts detected by the torque sensor 29 and the vehicle speed Vel detected by the vehicle speed sensor 32, further calculates a voltage command value with compensation or the like, and controls the inverter that drives the electric motor 30.

The automatic driving function group (first function group) includes, for example, a parking assistance function (Parking Assist), a lane keeping assistance function (Lane Keep Assist), a traffic jam driving assistance function (Traffic Jam Assist), and the like. The steering request SR1 relating to the function (first driving assistance function) belonging to the automatic driving function group (first function group) is a steering request by these automatic driving functions.

The steering feeling improving function group (second function group) includes, for example, a drive mode switching function (Change Drive Mode), a banked road compensation function (Banked Road Compensation), a driving track convergence control function (Drive Route Convergence Control), and a self-alignment torque compensation (Self Alignment Torque Compensation), and the like. The steering request SR2 relating to the function (second driving assistance function) belonging to the steering feeling improving function group (second function group) is a steering request by these steering feeling improving functions. The drive mode switching function is a function for switching the steering feeling by preparing a plurality of settings in which the magnitude of the steering assistance command for the steering torque is different. The banked road compensation function is a function to output a steering assistance force for reducing the steering wheel holding force (load) of the driver when driving straight on the bank (cant) for drainage. The driving track convergence control function outputs a damping compensation value for converging the yaw rate of the vehicle to ensure vehicle stability. The self-alignment torque compensation adjusts the steering reaction force due to the self-aligning torque from the tire to improve the steering feeling.

Other functions (third function group) are, for example, a lane departure warning function (Lane Departure Warning), and are steering driving functions that do not belong to the steering assistance function, the automatic driving function group (first function group), and the steering feeling improving function group (second function group). In the present embodiment, the third steering request SR3 regarding other functions (third function group) is a steering request by the lane departure warning function (Lane Departure Warning).

Driving Assistance Subsystem 100

The driving assistance subsystem 100 receives steering requests (SR1, SR2, SR3) other than the basic steering request SR0, converts the received steering request into a command value for the electric motor 30, and outputs the received steering request to the motor control module 120. The command value for the electric motor 30 is a current command value, a steering torque, a steering angle, a start command for a predetermined function, and the like.

The driving assistance subsystem 100 is provided independently for each function (function of automatic driving function group, function of steering feeling improving function group, and other functions). In the present embodiment, the driving assistance subsystem 100 is provided for each of the eight functions shown in Table 1. The names of the driving assistance subsystems 100 for each function are shown in Table 1.

TABLE 1

| FUNCTION NAME | NAME OF DRIVING ASSISTANCE SUBSYSTEM 100 |
|---|---|
| PARKING ASSIST FUNCTION (PARKING ASSIST) | DRIVING ASSISTANCE SUBSYSTEM PA |
| LANE KEEP ASSIST FUNCTION (LANE KEEP ASSIST) | DRIVING ASSISTANCE SUBSYSTEM LKA |
| TRAFFIC JAM ASSIST FUNCTION (TRAFFIC JAM ASSIST) | DRIVING ASSISTANCE SUBSYSTEM TJA |
| CHANGE DRIVE MODE FUNCTION (CHANGE DRIVE MODE) | DRIVING ASSISTANCE SUBSYSTEM CDM |
| BANKED ROAD COMPENSATION FUNCTION (BANKED ROAD COMPENSATION) | DRIVING ASSISTANCE SUBSYSTEM BRC |
| DRIVE ROUTE CONVERGENCE CONTROL FUNCTION (DRIVE ROUTE CONVERGENCE CONTROL) | DRIVING ASSISTANCE SUBSYSTEM DRCC |
| SELF ALIGNMENT TORQUE COMPENSATION FUNCTION (SELF ALIGNMENT TORQUE COMPENSATION) | DRIVING ASSISTANCE SUBSYSTEM SATC |
| LANE DEPARTURE WARNING FUNCTION (LANE DEPARTURE WARNING) | DRIVING ASSISTANCE SUBSYSTEM LDW |

Figure 5:
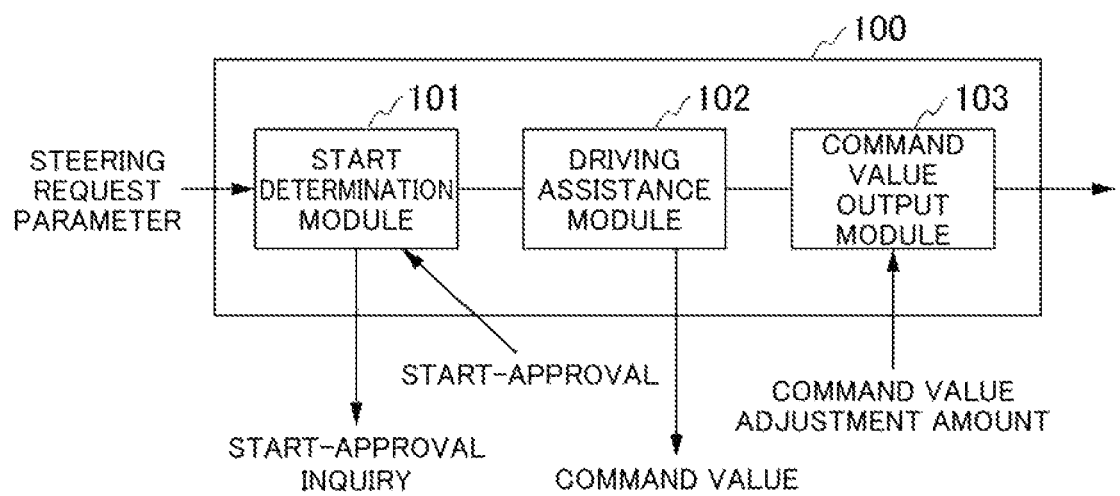
FIG. 5 is a functional block diagram of a driving assistance subsystem, which is a function of the controller.

FIG. 5 is a functional block diagram of the driving assistance subsystem 100.

The driving assistance subsystem 100 includes a start determination module 101, a driving assistance module 102, and a command value output module 103.

The start determination module 101 determines whether or not it is necessary to start the driving assistance subsystem 100 from steering requests and parameters received from an external vehicle system or the like. When the start determination module 101 determines that it is necessary to operate the driving assistance subsystem 100, it further inquires the arbitration module 110 whether or not the driving assistance subsystem 100 can be started, and determines whether or not the driving assistance subsystem 100 can be started. When the arbitration module 110 determines that the driving assistance subsystem 100 can be started, the start determination module 101 starts the driving assistance module 102.

The driving assistance module 102 performs the function assigned to the driving assistance subsystem 100. The driving assistance module 102 calculates and outputs a command value for the electric motor 30 based on the driving assistance function. The command value is sent to the command value output module 103 and the arbitration module 110.

The command value output module 103 adjusts and outputs the command value for the electric motor 30 calculated by the driving assistance module 102 based on the command value adjustment amount (gain or gain change speed) instructed from the arbitration module 110. For example, when the instructed gain is "50%", the command value output module 103 adjusts the command value for the electric motor 30 calculated by the driving assistance module 102 to 50% and outputs the command value.

In the present embodiment, for the driving assistance subsystem 100 (driving assistance subsystem PA, LKA, TJA) of the function belonging to the automatic driving function group (first function group), the command value adjustment amount is not instructed from the arbitration module 110.

The command value output module 103 may have a limiter module that performs limiting processing so that the command value or the change speed of the command value with respect to the electric motor 30 falls within a safe range, and a gradual change module that changes the command value at a specified rate of change so that the command value does not change suddenly at the start or end of operation.

Arbitration Module 110

Figure 6:
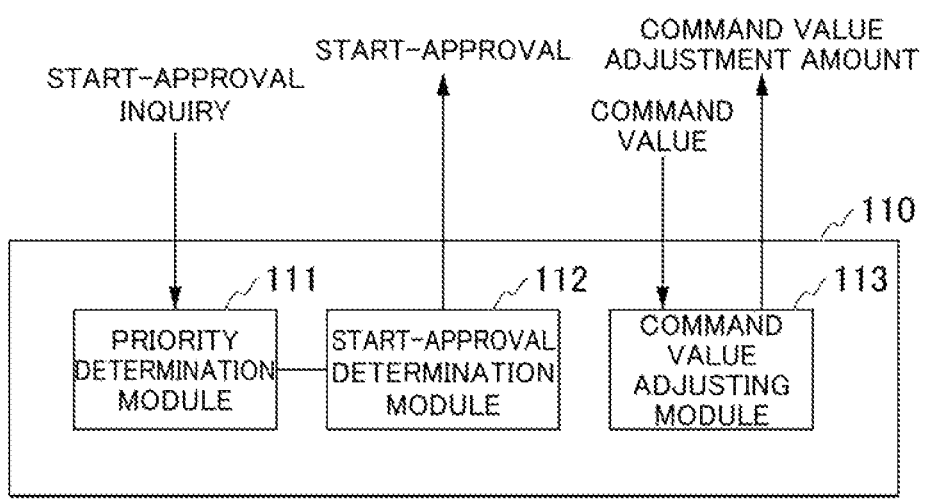
FIG. 6 is a functional block diagram of an arbitration module, which is a function of the controller.

FIG. 6 is a functional block diagram of the arbitration module 110.

The arbitration module 110 includes a priority determination module 111, a start-approval determination module 112, and a command value adjusting module 113.

Priority Determination Module 111

When the priority determination module 111 newly receives a start request from a plurality of driving assistance subsystems 100 in a predetermined period, the priority determination module 111 determines the driving assistance subsystem 100 as a startable candidate.

Figure 7:
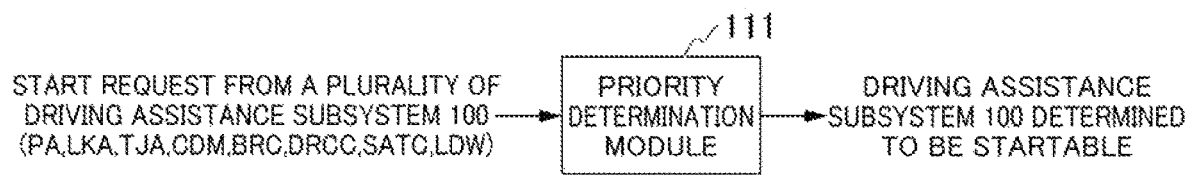
FIG. 7 is a diagram showing input/output of a priority determination module, which is a function of the controller.

FIG. 7 is a diagram showing input/output of the priority determination module 111.

The input of the priority determination module 111 is a start request from a plurality of driving assistance subsystems 100. The output of the priority determination module 111 is the driving assistance subsystem 100 determined to be startable.

The priority determination module 111 determines the driving assistance subsystem 100 as a startable candidate based on the priority table shown in Table 2. The driving assistance subsystem 100, which has a smaller value indicating priority, has a higher priority. In this embodiment, the driving assistance subsystem TJA has the highest priority.

TABLE 2

| DRIVING ASSISTANCE SUBSYSTEM 100 | PRIORITY |
|---|---|
| DRIVING ASSISTANCE SUBSYSTEM PA | 3 |
| DRIVING ASSISTANCE SUBSYSTEM LKA | 2 |
| DRIVING ASSISTANCE SUBSYSTEM TJA | 1 |
| DRIVING ASSISTANCE SUBSYSTEM CDM | — |
| DRIVING ASSISTANCE SUBSYSTEM BRC | — |
| DRIVING ASSISTANCE SUBSYSTEM DRCC | — |
| DRIVING ASSISTANCE SUBSYSTEM SATC | — |
| DRIVING ASSISTANCE SUBSYSTEM LDW | — |

When receiving a new start request from a plurality of driving assistance subsystems 100 in a predetermined period, the priority determination module 111 determines the driving assistance subsystem 100 having the highest priority among the driving assistance subsystems 100 having the priority as a startable candidate.

For example, when newly receiving a start request from the driving assistance subsystem TJA and the driving assistance subsystem LKA in a predetermined period, the priority determination module 111 determines the driving assistance subsystem TJA having a high priority as a startable candidate.

The driving assistance subsystem 100 (driving assistance subsystems PA, LKA, TJA) of the function belonging to the automatic driving function group (first function group) has a priority, and is exclusively selected as a startable candidate by the priority determination module 111.

The driving assistance subsystem 100 having no priority is not subject to the startable candidate determination based on the priority. When receiving a new start request from the driving assistance subsystem 100 having no priority, the priority determination module 111 always determines the driving assistance subsystem 100 as a startable candidate. Therefore, the startable candidates determined by the priority determination module 111 may be a plurality of driving assistance subsystems 100.

The driving assistance subsystem 100 (driving assistance subsystem CDM, BRC, DRCC, SATC) of the function belonging to the steering feeling improving function group (second function group) and the driving assistance subsystem 100 (driving assistance subsystem LDW) of the function belonging to other functions (third function group) do not have priority, and are not subject to startable candidate determination based on priority. When a new start request is received from the driving assistance subsystem 100 of the functions belonging to the steering feeling improving function group (second function group) and other functions (third function group), the driving assistance subsystem 100 is always determined to be a startable candidate.

Start-Approval Determination Module 112

The start-approval determination module 112 determines whether or not the driving assistance subsystem 100 determined by the priority determination module 111 to be a startable candidate can be started in consideration of the operation status of the other driving assistance subsystems 100. The operation status of the driving assistance subsystem 100 is either "operating" or "stopping".

Figure 8:
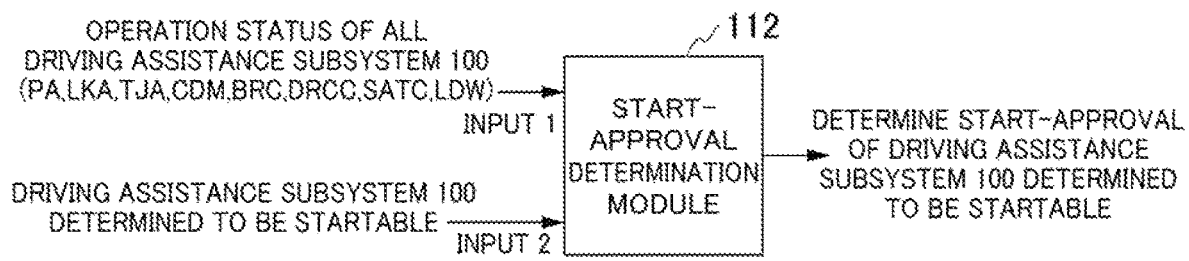
FIG. 8 is a diagram showing input/output of a start-approval determination module, which is a function of the controller.

FIG. 8 is a diagram showing input/output of the start-approval determination module 112.

The input of the start-approval determination module 112 is the operation status (input 1) of all the driving assistance subsystems 100 and the driving assistance subsystem 100 (input 2) determined to be startable, which is the output of the priority determination module 111. The output of the start-approval determination module 112 is the start-approval of the driving assistance subsystem 100 determined to be startable.

The start-approval determination module 112 determines the startable driving assistance subsystem 100 based on the start-approval determination table shown in Table 3. In Table 3, "possible" indicates that the driving assistance subsystem 100 can be started. "Impossible" indicates that the driving assistance subsystem 100 cannot be started. "-" Indicates that the driving assistance subsystem 100 is already in operation and does not determine whether or not it can be started.

TABLE 3

OPERATION STATUS OF
DRIVING ASSISTANCE SUBSYSTEM 100
(INPUT 1)

| ENTRY NUMBER | FIRST FUNCTION GROUP | | | SECOND FUNCTION GROUP | | | | THIRD FUNCTION GROUP |
|---|---|---|---|---|---|---|---|---|
| | PA | LKA | TJA | CDM | BRC | DRCC | SATC | LDW |
| 1 | STOP | STOP | STOP | STOP | STOP | STOP | STOP | STOP |
| 2 | STOP | STOP | STOP | STOP | OPER-ATING | STOP | STOP | STOP |
| 3 | OPER-ATING | STOP | STOP | STOP | STOP | STOP | STOP | STOP |
| 4 | STOP | OPER-ATING | STOP | STOP | STOP | STOP | STOP | STOP |
| 5 | STOP | OPER-ATING | STOP | STOP | STOP | STOP | STOP | OPER-ATING |
| 6 | STOP | OPER-ATING | STOP | STOP | OPER-ATING | STOP | STOP | STOP |
| 7 | STOP | STOP | OPER-ATING | STOP | OPER-ATING | STOP | OPER-ATING | OPER-ATING |

START-APPROVAL OF
DRIVING ASSISTANCE SUBSYSTEM 100
(OUTPUT)

| ENTRY NUMBER | FIRST FUNCTION GROUP | | | SECOND FUNCTION GROUP | | | | THIRD FUNCTION GROUP |
|---|---|---|---|---|---|---|---|---|
| | PA | LKA | TJA | CDM | BRC | DRCC | SATC | LDW |
| 1 | POSSIBLE | POSSIBLE | POSSIBLE | POSSIBLE | POSSIBLE | POSSIBLE | POSSIBLE | POSSIBLE |
| 2 | POSSIBLE | POSSIBLE | POSSIBLE | POSSIBLE | — | POSSIBLE | POSSIBLE | POSSIBLE |
| 3 | — | IMPOSSIBLE | IMPOSSIBLE | POSSIBLE | POSSIBLE | POSSIBLE | POSSIBLE | IMPOSSIBLE |
| 4 | IMPOSSIBLE | — | IMPOSSIBLE | POSSIBLE | POSSIBLE | POSSIBLE | POSSIBLE | POSSIBLE |
| 5 | IMPOSSIBLE | — | IMPOSSIBLE | POSSIBLE | POSSIBLE | POSSIBLE | POSSIBLE | — |
| 6 | IMPOSSIBLE | — | IMPOSSIBLE | POSSIBLE | — | POSSIBLE | POSSIBLE | POSSIBLE |
| 7 | IMPOSSIBLE | IMPOSSIBLE | — | POSSIBLE | — | POSSIBLE | — | — |

The start-approval determination table has entries corresponding to the combination of the operation status (input 1) of all the driving assistance subsystems 100. Since there are eight types of driving assistance subsystems 100 in this embodiment, the start-approval determination table has 256 entries. Any one entry is selected based on the operation status (input 1) of all driving assistance subsystems 100.

The start-approval determination table has the start-approval (output) of the driving assistance subsystem 100 for each entry. Whether or not to start the operation corresponding to the driving assistance subsystem 100 (input 2) determined to be startable is selected and output. The start-approval determined by the start-approval determination module 112 is sent to the start determination module 101.

For example, when the driving assistance subsystems TJA, SATC, and LDW are input as the input 2 in the operation status (input 1) of the driving assistance subsystem 100 as shown in the entry number 2 in Table 3, "possible" for the driving assistance subsystem TJA, "possible" for the driving assistance subsystem SATC, and "possible" for the driving assistance subsystem LDW are output, based on the start-approval determination table.

For example, when the driving assistance subsystems TJA, SATC, and LDW are input as the input 2 in the operation status (input 1) of the driving assistance subsystem 100 as shown in the entry number 4 of Table 3, "impossible" for the driving assistance subsystem TJA, "possible" for the driving assistance subsystem SATC, and "possible" for the driving assistance subsystem LDW are output, based on the start-approval determination table.

When the operation status of the driving assistance subsystem 100 (driving assistance subsystems PA, LKA, TJA) of the function belonging to the automatic driving function group (first function group) is "operating", whether or not the driving assistance subsystem 100 of other functions belonging to the automatic driving function group (first function group) can be started is "impossible". That is, two or more functions belonging to the automatic driving function group (first function group) are not performed at the same time.

Whether or not the functions can be started for the driving assistance subsystem 100 (driving assistance subsystem CDM, BRC, DRCC, SATC) belonging to the steering feeling improving function group (second function group) is all "possible" unless its own function is "operating".

Whether or not the functions can be started for the driving assistance subsystem 100 (driving assistance subsystem LDW) belonging to the other functions (third function group) is "possible" unless the driving assistance subsystem PA or its own function is "operating".

Command Value Adjusting Module 113

The command value adjusting module 113 monitors the command value and the start/stop status output by the driving assistance subsystem 100 (driving assistance subsystems PA, LKA, TJA) of the function belonging to the automatic driving function group (first function group), and determines the command value adjustment amount for the driving assistance subsystem 100 (driving assistance subsystem CDM, BRC, DRCC, SATC) of the function belonging to the steering feeling improving function group (second function group).

Figure 9:
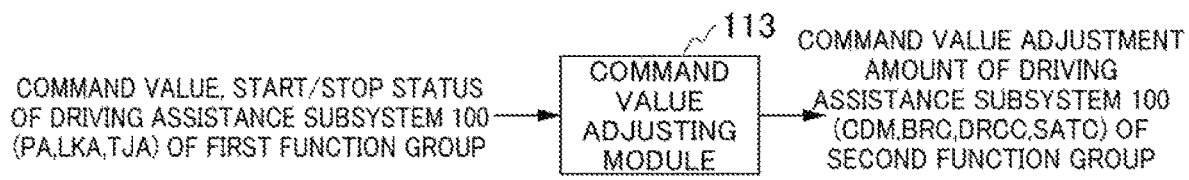
FIG. 9 is a diagram showing input/output of a command value adjusting module, which is a function of the controller.

FIG. 9 is a diagram showing input/output of the command value adjusting module 113.

The input of the command value adjusting module 113 is command value or start/stop status output by the driving assistance subsystem 100 (driving assistance subsystems PA, LKA, TJA) of the function belonging to the automatic driving function group (first function group). The output of the command value adjusting module 113 is a command value adjustment amount for the driving assistance subsystem 100 (driving assistance subsystem CDM, BRC, DRCC, SATC) of the function belonging to the steering feeling improving function group (second function group).

The command value adjusting module 113 outputs a command value adjustment amount based on the start-up command value adjustment table shown in Table 4 when the driving assistance subsystem 100 of the function belonging to the automatic driving function group (first function group) is started. Here, the values shown in Table 4 are examples and are adjusted according to the characteristics of the vehicle.

The start-up command value adjustment table has a command value adjustment amount for the driving assistance subsystem 100 (driving assistance subsystem CDM, BRC, DRCC, SATC) of the function belonging to the steering feeling improving function group (second function group), for each driving assistance subsystem 100 (driving assistance subsystem PA, LKA, TJA) of the function belonging to the automatic driving function group (first function group) to be started.

For example, when the driving assistance subsystem TJA is started, the command value adjusting module 113 outputs the command value adjustment amount shown in the bottom line of Table 4 to the driving assistance subsystems CDM, BRC, DRCC, and SATC. Specifically, a command value adjustment amount of "gradually decreasing the command value at 10%/s until the command value reaches 0%" is output to the driving assistance subsystem BRC. Further, a command value adjustment amount of "changing the drive mode to the Normal mode" is output to the driving assistance subsystem CDM. Further, for the driving assistance subsystems DRCC and SATC, a command value adjustment amount of "gradually decreasing the command value at 10%/s until the command value reaches 50%" is output.

The command value adjusting module 113 outputs a command value adjustment amount for adjusting the command value of the driving assistance subsystem 100 of the function belonging to the steering feeling improving function group (second function group), so that the command value output by the driving assistance subsystem 100 of the function belonging to the started automatic driving function group (first function group) is prioritized. The command value adjusting module 113 outputs, for example, a command value adjustment amount for reducing the command value to the driving assistance subsystems BRC, DRCC, and SATC. The command value adjusting module 113 outputs a command value adjustment amount to the driving assistance subsystem CDM so as to change the drive mode to the normal mode so that the specific function is invalidated.

The command value adjusting module 113 outputs a command value adjustment amount based on the stop command value adjustment table shown in Table 5 when the driving assistance subsystem 100 of the function belonging to the automatic driving function group (first function group) is stopped. Here, the values shown in Table 5 are examples and are adjusted according to the characteristics of the vehicle.

TABLE 4

| | | | COMMAND VALUE ADJUSTMENT AMOUNT (OUTPUT) SECOND FUNCTION GROUP | | | |
|---|---|---|---|---|---|---|
| | | | QDM | BRC | DRCC | SATC |
| FUNCTION TO BE STARTED (INPUT) | FIRST FUNCTION GROUP | PA | — | — | TARGET 0% GRADUALLY DECREASING AT 50%/s | TARGET 0% GRADUALLY DECREASING AT 50%/s |
| | | LKA | CHANGE TO NORMAL MODE | TARGET 0% GRADUALLY DECREASING AT 50%/s | — | — |
| | | TJA | CHANGE TO NORMAL MODE | TARGET 0% GRADUALLY DECREASING AT 10%/s | TARGET 50% GRADUALLY DECREASING AT 10%/s | TARGET 50% GRADUALLY DECREASING AT 10%/s |

TABLE 5

| | | | COMMAND VALUE ADJUSTMENT AMOUNT (OUTPUT) SECOND FUNCTION GROUP | | | |
|---|---|---|---|---|---|---|
| | | | CDM | SRC | DRCC | SATC |
| FUNCTION TO BE STOPPED (INPUT) | FIRST FUNCTION GROUP | PA | — | — | TARGET 100% GRADUALLY INCREASING AT 50%/s | TARGET 100% GRADUALLY INCREASING AT 50%/s |
| | | LKA | CHANGE TO ORIGINAL DRIVE MODE | TARGET 100% GRADUALLY INCREASING AT 10%/s | — | — |
| | | TJA | CHANGE TO ORIGINAL DRIVE MODE | TARGET 100% GRADUALLY INCREASING AT 10%/s | TARGET 100% GRADUALLY INCREASING AT 10%/s | TARGET 100% GRADUALLY INCREASING AT 10%/s |

The stop command value adjustment table has a command value adjustment amount for the driving assistance subsystem 100 (driving assistance subsystem CDM, BRC, DRCC, SATC) of the function belonging to the steering feeling improving function group (second function group), for each driving assistance subsystem 100 (driving assistance subsystem PA, LKA, TJA) of the function belonging to the automatic driving function group (first function group) to be stopped.

For example, when the driving assistance subsystem TJA is stopped, the command value adjusting module 113 outputs the command value adjustment amount shown in the bottom line of Table 5 to the driving assistance subsystems CDM, BRC, DRCC, and SATC. Specifically, for the driving assistance subsystems BRC, DRCC, and SATC, a command value adjustment amount of "gradually increasing the command value at 10%/s until the command value reaches 100%" is output. Further, the command value adjustment amount of "changing the drive mode to the original drive mode before changing to the normal mode" is output to the driving assistance subsystem CDM.

When the driving assistance subsystem 100 of the function belonging to the automatic driving function group (first function group) is stopped, the command value adjusting module 113 outputs a command value adjustment amount that restores the adjusted command value of the driving assistance subsystem 100 of the function belonging to the steering feeling improving function group (second function group).

The motor control module 120 receives a command value output by the driving assistance subsystem 100, and outputs a signal for driving the electric motor 30. As shown in FIG. 4, the motor control module 120 includes a torque control module 121 and a current control module 122.

The torque control module 121 adds the command value calculated based on the steering torque Ts output by the torque sensor 29 and the command value output by each driving assistance subsystem 100 and converts the command value into a current command value.

The current control module 122 performs processing such as limiting the maximum value of the current command value output by the torque control module 121, converts it into a signal for driving the electric motor 30, and outputs the signal.

Steering Requirements (SR1, SR2, SR3)

Figure 10:
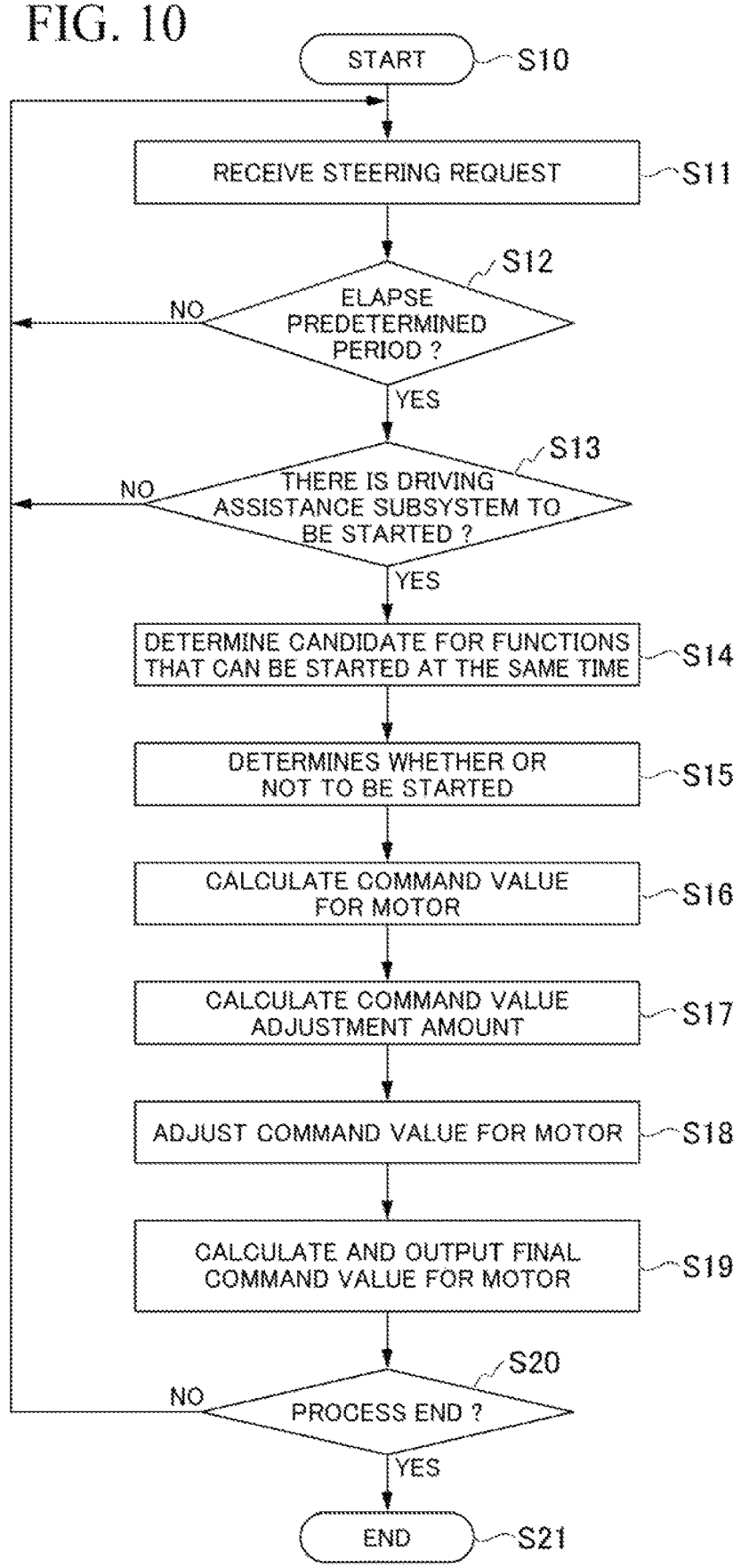
FIG. 10 is a control flowchart of the controller that has received a steering request (SR1, SR2, SR3).

Next, the controller 34 that has received the steering request (SR1, SR2, SR3) will be described in detail. FIG. 10 is a control flowchart of the controller 34 that has received the steering request (SR1, SR2, SR3).

As shown in FIG. 10, when the controller 34 is started, the controller 34 starts control after performing initialization (step S10). Next, the controller 34 performs step S11.

In step S11, the controller 34 receives the steering request (SR1, SR2, SR3). Next, in step S12, the controller 34 determines whether or not the predetermined period has elapsed. When the predetermined period has not elapsed, the controller 34 performs step S11 and continues to receive the steering request. When the predetermined period has elapsed, the controller 34 performs step S13.

In step S13, the controller 34 determines whether there is a driving assistance subsystem 100 that needs to be started by the start determination module 101. When there is no driving assistance subsystem 100 that needs to be started, the controller 34 performs step S11 again. When there is a driving assistance subsystem 100 that needs to be started, the controller 34 performs step S14. For example, suppose that in step S13, it is determined that the driving assistance subsystems PA, LKA, TJA, SATC, and LDW can be started.

In step S14, the controller 34 determines the candidates for the functions that can be started at the same time by the priority determination module 111. The driving assistance subsystems PA, LKA, and TJA have priorities, and are exclusively selected as startable candidates by the priority determination module 111. In this embodiment, the driving assistance subsystem TJA has the highest priority. Therefore, the driving assistance subsystem TJA is determined to be a startable candidate, and the driving assistance subsystems PA and LKA are not determined to be startable candidates. The driving assistance subsystem SATC and the driving assistance subsystem LDW do not have priority and are not subject to the startable candidate determination based on the priority, and both are determined to be startable candidates.

In step S14, the controller 34 determines that the driving assistance subsystems TJA, SATC, and LDW are startable candidates. Next, the controller 34 performs step S15.

In step S15, the controller 34 determines whether or not the driving assistance subsystem 100 determined to be a startable candidate can be started in consideration of the operation status of the other driving assistance subsystems 100 by the start-approval determination module 112. The controller 34 determines that the driving assistance subsystems TJA, SATC, and LDW can be started based on the start-approval determination table. Next, the controller 34 performs step S16.

In step S16, the controller 34 causes the driving assistance module 102 of the driving assistance subsystems TJA, SATC, and LDW to calculate a command value for the electric motor 30 based on each function. Next, the controller 34 performs step S17.

In step S17, the controller 34 determines the command value adjustment amount for the driving assistance subsystems CDM, BRC, DRCC, and SATC by the command value adjusting module 113. The controller 34 outputs the command value adjustment amount for the driving assistance subsystems CDM, BRC, DRCC, and SATC when the driving assistance subsystem TJA is started, based on the start-up command value adjustment table shown in Table 4. Next, the controller 34 performs step S18.

In step S18, the controller 34 adjusts and outputs the command value for the electric motor 30 calculated by the driving assistance module 102 based on the command value adjustment amount by the command value output module 103. Next, the controller 34 performs step S19.

In step S19, the controller 34 receives the command value output by the driving assistance subsystem 100 by the motor control module 120, and calculates the command value to be final (final command value) for the electric motor 30. Next, the controller 34 performs step S20.

In step S20, the controller 34 determines whether to end the control. When the control is not ended, the controller 34 performs step S11. When ending the control, the controller performs step S21.

Basic Steering Request SR0

Figure 11:
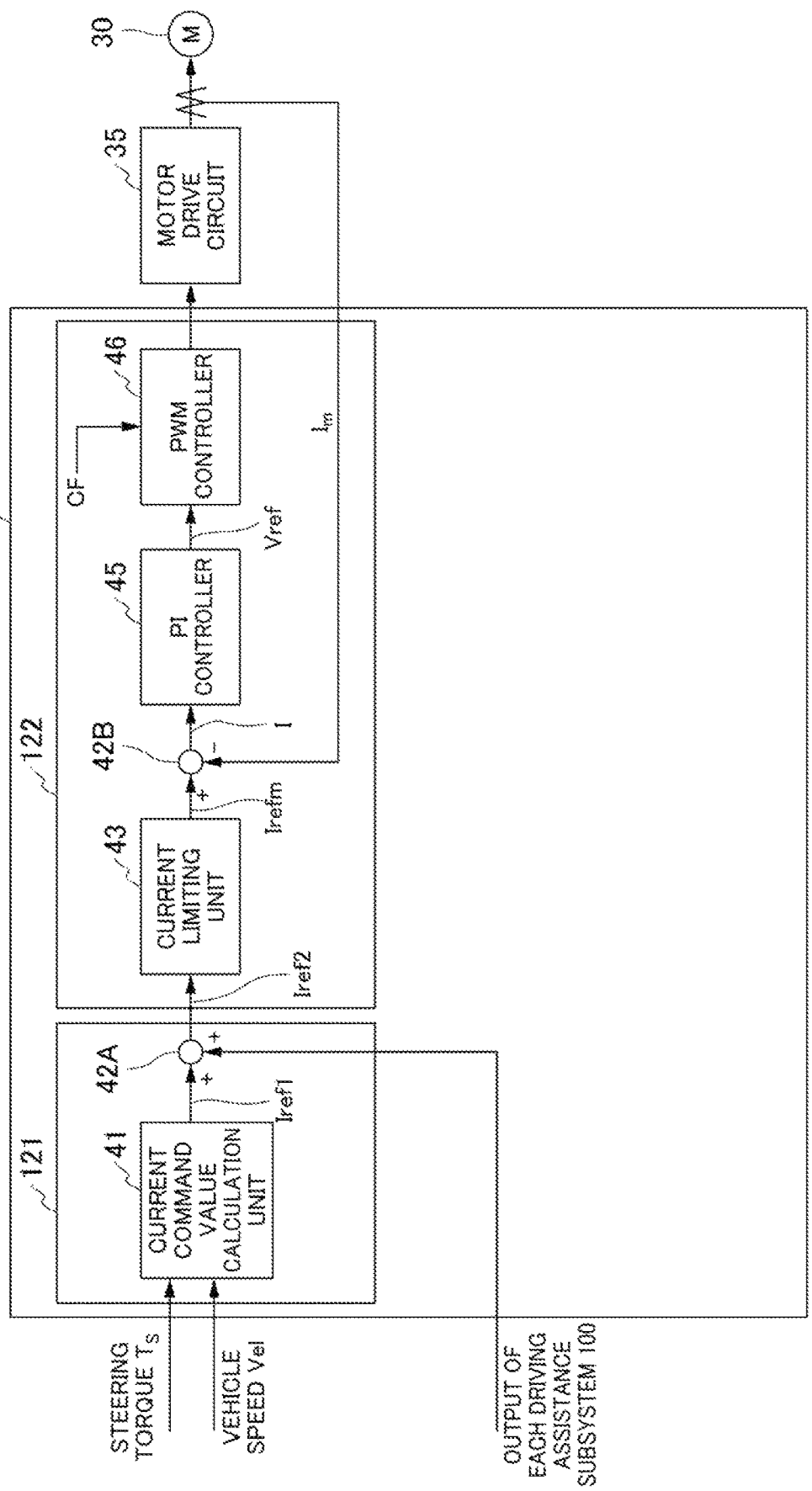
FIG. 11 is a functional block diagram of the controller that has received a basic steering request.

FIG. 11 is a functional block diagram of the motor control module 120 in the controller 34 that has received the basic steering request SR0. The steering torque Ts detected by the torque sensor 29 and the vehicle speed Vel detected by the vehicle speed sensor 32 are input to the current command value calculation unit 41 that calculates the current command value Iref1. The current command value calculation unit 41 calculates the current command value Iref1, which is the control target value of the current supplied to the electric motor 30, by using the assist map or the like based on the input steering torque Ts and the vehicle speed Vel.

The current command value Iref1 is input to the current limiting unit 43 in the current control module 122 via the adding unit 42A, the current command value Ireffm whose maximum current is limited is input to the subtracting unit 42B, and the deviation I (Irefm-Im) from the fed-back motor current value Im is calculated. The deviation I is input to the PI (proportional integration) controller 45 in order to improve the characteristics of the steering operation.

The voltage control value Vref PI-controlled by the PI controller 45 is input to the PWM controller 46 together with the modulation signal (carrier) CF. The PWM controller 46 calculates the duty and PWM-drives the electric motor 30 via the motor drive circuit 35 by the PWM signal.

The motor current value is detected by the motor current detecting means, input to the subtracting unit 42B, and fed back. In the case of a three-phase brushless motor, the PWM controller 46 is composed of a duty calculation unit, which calculates a PWM duty value D for three phases according to a predetermined formula, and a gate drive unit that drives the gate of the FET as a drive element with a PWM duty value D and turns on/off by compensating for dead time. The motor drive circuit 35 is composed of, for example, a three-phase bridge including an upper and lower arms composed of a U-phase upper FET and a lower FET, and the electric motor 30 is driven by turning on/off each FET at the PWM duty value D.

The output from each driving assistance subsystem 100 is input to the adding unit 42A. For example, when the driving assistance subsystem SATC is started, the steering reaction force due to the self-aligning torque from the tire is compensated.

When the driver steers the steering wheel 1, the torque sensor 29 detects the steering torque Ts. Upon receiving the basic steering request SR0, the ECU 33 controls the drive of the electric motor 30 so that the steering torque Ts becomes smaller based on the steering torque Ts and the vehicle speed Vel detected by the vehicle speed sensor 32. As a result, the worm 31a is rotationally driven by the electric motor 30 controlled by the ECU 33. The electric motor 30 can assist the driver in steering by rotationally driving the worm 31a.

The controller 34, which has received the steering request (SR1, SR2, SR3) in accordance with the basic steering request SR0, adds the command value output by the driving assistance subsystem 100 to the command value for the electric motor 30 calculated based on the basic steering request SR0, to calculate and output the command value (final command value) for the final electric motor 30.

The controller 34 may replace the command value for the electric motor 30 calculated based on the basic steering request SR0 by the command value output by the driving assistance subsystem 100 (driving assistance subsystems PA, LKA, TJA) of the function belonging to the automatic driving function group (first function group). In this case, regardless of the steering of the steering wheel 1 of the driver, steering by a function belonging to the automatic driving function group (first function group) is performed.

According to the power steering device 200 of the present embodiment, a plurality of driving assistance functions that can be operated at the same time can be operated in a coordinated manner. In particular, the power steering device 200 outputs a command value adjustment amount for adjusting the command value of the driving assistance subsystem 100 of the function belonging to the steering feeling improving function group (second function group), so that the command value output by the operation assistance subsystem 100 of the function belonging to the started automatic operation function group (first function group) is prioritized. Further, when the driving assistance subsystem 100 of the function belonging to the automatic driving function group (first function group) is stopped, a command value adjustment amount that restores the adjusted command value of the driving assistance subsystem 100 of the function belonging to the steering feeling improving function group (second function group) is output. Therefore, the function belonging to the automatic driving function group (first function group) can be appropriately coordinated with the function belonging to the steering feeling improving function group (second function group) that the power steering device 200 conventionally has.

According to the power steering device 200 of the present embodiment, when adjusting the command value of the driving assistance subsystem 100 of the function belonging to the steering feeling improving function group (second function group), the command value adjustment method can be set in advance according to the function, based on the start command value adjustment table and the stop command value adjustment table. Therefore, when a function belonging to the automatic driving function group (first function group) is started or stopped, the command value can be adjusted according to the function.

Although the first embodiment of the present invention has been described in detail with reference to the drawings, the specific configuration is not limited to this embodiment, and includes design changes and the like within a range that does not deviate from the gist of the present invention. In addition, the components shown in the above-described embodiments and modifications can be appropriately combined and configured.

Second Embodiment

A second embodiment of the present invention will be described with reference to FIGS. 12 to 14. In the following description, the same reference numerals will be given to the configurations common to those already described, and a duplicate description will be omitted.

The power steering device 200B according to the second embodiment has the same configuration as the power steering device 200 according to the first embodiment, and only a part of the functions of the controller 34 is different from the power steering device 200.

In the second embodiment, the functional block of the controller 34 includes a driving assistance subsystem 100 that receives steering requests (SR1, SR2, SR3) other than the basic steering request SR0, an arbitration module 110B, and a motor control module 120.

The arbitration module 110B includes a priority determination module 111, a start-approval determination module 112, and a command value adjusting module 113B.

Command Value Adjusting Module 113B

The command value adjusting module 113B monitors the command value and the start/stop status output by the driving assistance subsystem 100 (driving assistance subsystems PA, LKA, TJA) of the function belonging to the automatic driving function group (first function group), and determines the command value adjustment amount for the driving assistance subsystem 100 (driving assistance subsystem CDM, BRC, DRCC, SATC) of the function belonging to the steering feeling improving function group (second function group).

In the first embodiment, the command value adjusting module 113 monitors the start/stop status of the driving assistance subsystem 100 (driving assistance subsystem PA, LKA, TJA) of the function belonging to the automatic driving function group (first function group). On the other hand, in the second embodiment, the command value adjusting module 113B monitors the command value output by the driving assistance subsystem 100 (driving assistance subsystems PA, LKA, TJA) of the function belonging to the automatic driving function group (first function group).

The command value adjusting module 113B outputs a command value adjustment amount based on the command value adjustment table shown in Table 6 with respect to the command value output by the driving assistance subsystem 100 (driving assistance subsystems PA, LKA, TJA).

TABLE 6

| | | COMMAND VALUE ADJUSTMENT AMOUNT (OUTPUT) SECOND FUNCTION GROUP | | | | | | |
|---|---|---|---|---|---|---|---|---|
| | | CDM | | | | | BRC | |
| | | CONDITION | PROCESS TYPE | TARGET GAIN | GRADUAL INCREASE RATE | GRADUAL DECREASE RATE | CONDITION | PROCESS TYPE |
| FIRST FUNCTION GROUP (INPUT) | PA | — | — | — | — | — | — | — |
| | | — | — | — | — | — | — | — |
| | LKA | V = 0% | PROCESS 2 | — | — | — | V = 0% | NORMAL |
| | | V > 0% | PROCESS 1 | — | — | — | V > 0% | NORMAL |
| | TJA | — | — | — | — | — | — | — |
| | | V = 0% | PROCESS 2 | — | — | — | V = 0% | NORMAL |
| | | V > 0% | PROCESS 1 | — | — | — | V > 0% | NORMAL |
| | | — | — | — | — | — | — | — |

| | | COMMAND VALUE ADJUSTMENT AMOUNT (OUTPUT) SECOND FUNCTION GROUP | | | | | | |
|---|---|---|---|---|---|---|---|---|
| | | BRC | | | DRCC | | | |
| | | TARGET GAIN | GRADUAL INCREASE RATE | GRADUAL DECREASE RATE | CONDITION | PROCESS TYPE | TARGET GAIN | GRADUAL INCREASE RATE |
| FIRST FUNCTION GROUP (INPUT) | PA | — | — | — | V ≤ 5% | NORMAL | 100% | 50%/s |
| | | — | — | — | V > 5% | NORMAL | 50% | — |
| | LKA | 100% | 10%/s | — | — | — | — | — |
| | | 0% | — | 10%/s | — | — | — | — |
| | TJA | 100% | 10%/s | — | V ≤ 5% | NORMAL | 100% | 10%/s |

TABLE 6-continued

| | | 0% | — | 10%/s | V > 5% | NORMAL | 50% | — |
|---|---|---|---|---|---|---|---|---|
| | | — | — | — | — | — | — | — |

| | | COMMAND VALUE ADJUSTMENT AMOUNT (OUTPUT) SECOND FUNCTION GROUP | | | | | | |
|---|---|---|---|---|---|---|---|---|
| | | DRCC | SATC | | | | | |
| | | GRADUAL DECREASE RATE | CONDITION | PROCESS TYPE | TARGET GAIN | GRADUAL INCREASE RATE | GRADUAL DECREASE RATE | |
| FIRST FUNCTION GROUP (INPUT) | PA | — | V ≤ 10% | NORMAL | 100% | 50%/s | — | |
| | | 50%/s | 10% < V ≤ 20% | NORMAL | 50% | 50%/s | 50%/s | |
| | | — | V > 20% | NORMAL | 0% | — | 50%/s | |
| | LKA | — | — | — | — | — | — | |
| | | — | — | — | — | — | — | |
| | TJA | — | V ≤ 10% | NORMAL | 100% | 10%/s | — | |
| | | 10%/s | 10% < V ≤ 20% | NORMAL | 50% | 10%/s | 10%/s | |
| | | — | V > 20% | NORMAL | 0% | — | 10%/s | |

NOTE)
PROCESS 1: CHANGE DRIVE MODE TO NORMAL MODE
PROCESS 2: CHANGE DRIVE MODE TO ORIGINAL DRIVE MODE
NORMAL: ADJUST TARGET GAIN

When the command value output by the driving assistance subsystem 100 (driving assistance subsystems PA, LKA, TJA) corresponds to the conditions of the command value adjustment table, the command value adjusting module 113B outputs the command value adjustment amount for the driving assistance subsystem 100 (driving assistance subsystems CDM, BRC, DRCC, SATC) of the function belonging to the steering feeling improvement function group (second function group), based on the command value adjustment table.

Figure 12:
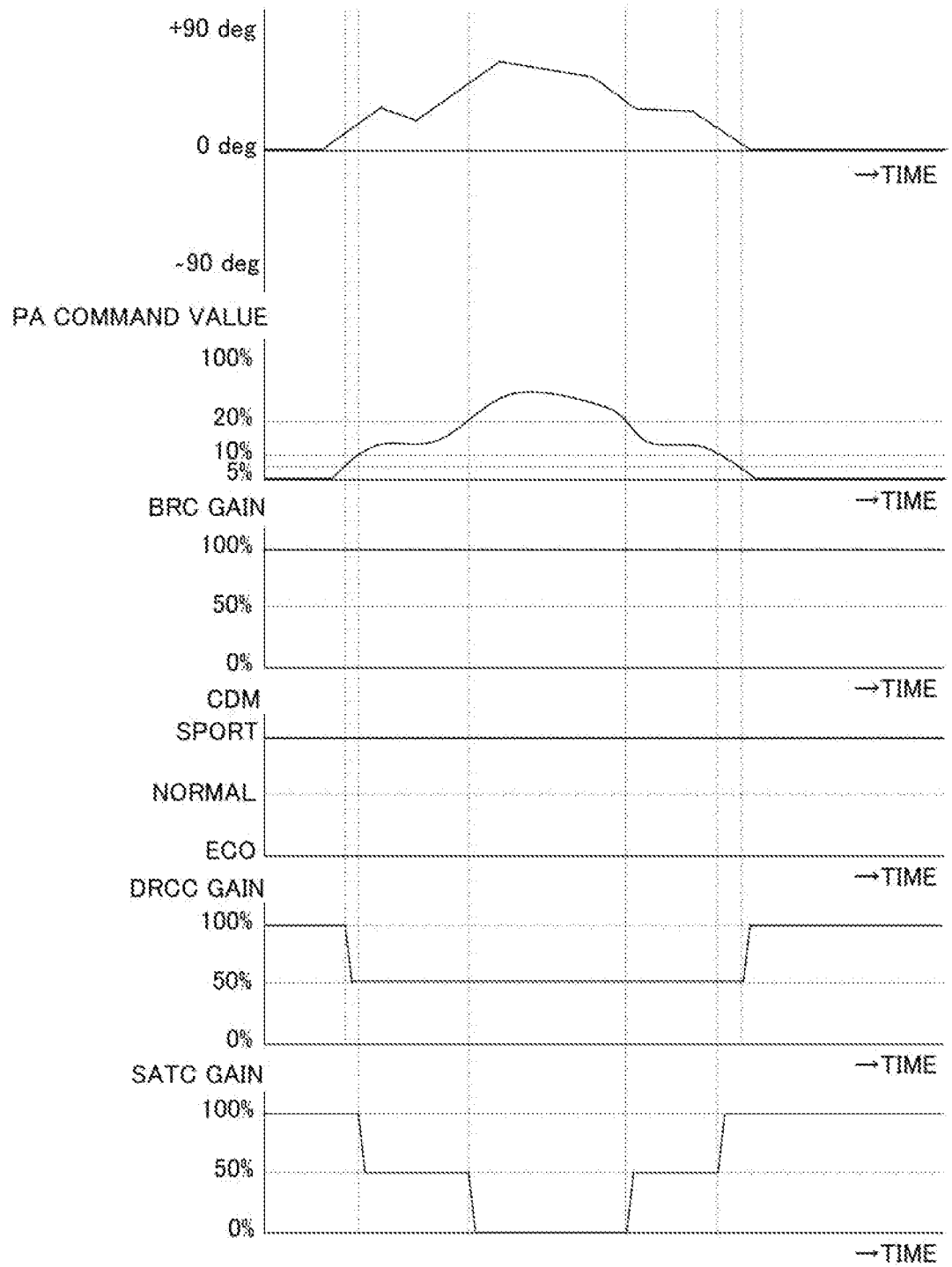
FIG. 12 is a command value adjustment amount output by a command value adjusting module based on a command value output by a driving assistance subsystem PA of a power steering device according to a second embodiment of the present invention.

FIG. 12 shows a command value adjustment amount output by the command value adjusting module 113B to the driving assistance subsystems CDM, BRC, DRCC, and SATC based on the command value output by the driving assistance subsystem PA.

The driving assistance subsystem PA receives the "target steering angle" as a parameter together with the steering request SR1. The command value V output by the driving assistance subsystem PA is obtained by converting the target steering angle into the current command value for the electric motor 30 and then calculating the moving average of the absolute value to calculate the ratio (%) with the maximum output current. By the above calculation, the displacement of the command value V becomes gentle, and it is possible to prevent the output command value adjustment amount from suddenly fluctuating.

When the command value V of the driving assistance subsystem PA is within 5%, the command value adjusting module 113B gradually increases the output gain of the driving assistance subsystem DRCC at 50%/s, and finally outputs a command value adjustment amount with a gain of 100%.

When the command value V of the driving assistance subsystem PA is larger than 5%, the command value adjusting module 113B gradually decreases the output gain of the driving assistance subsystem DRCC at 50%/s, and finally outputs a command value adjustment amount with a gain of 50%.

When the command value V of the driving assistance subsystem PA is within 10%, the command value adjusting module 113B gradually increases the output gain of the driving assistance subsystem SATC at 50%/s, and finally outputs a command value adjustment amount with a gain of 100%.

When the command value V of the driving assistance subsystem PA is 20% or less and larger than 10%, the command value adjusting module 113B gradually decreases or gradually increases the output gain of the driving assistance subsystem SATC at 50%/s, and finally outputs a command value adjustment amount with a gain of 50%.

When the command value V of the driving assistance subsystem PA is larger than 20%, the command value adjusting module 113B gradually decreases the output gain of the driving assistance subsystem SATC at 50%/s, and finally outputs a command value adjustment amount with a gain of 0%.

Regardless of the command value V of the driving assistance subsystem PA, the command value adjusting module 113B does not output the command value adjustment amount for adjusting the command value to the driving assistance subsystems CDM and BRC.

FIG. 13 is a command value adjustment amount output by the command value adjusting module 113B to the driving assistance subsystems CDM, BRC, DRCC, and SATC based on the command value output by the driving assistance subsystem LKA.

The driving assistance subsystem LKA receives the "target torque" as a parameter together with the steering request SR1. The command value V output by the driving assistance subsystem LKA is obtained by converting the target torque into the current command value for the electric motor 30 and then calculating the moving average of the absolute value to calculate the ratio (%) with the maximum output current. By the above calculation, the displacement of the command value V becomes gentle, and it is possible to prevent the output command value adjustment amount from suddenly fluctuating.

When the command value V of the driving assistance subsystem LKA is 0%, the command value adjusting module 113B gradually increases the output gain of the driving assistance subsystem BRC at 10%/s, and finally outputs a command value adjustment amount with a gain of 100%.

When the command value V of the driving assistance subsystem LKA is larger than 0%, the command value adjusting module 113B gradually decreases the output gain of the driving assistance subsystem BRC at 10%/s, and finally outputs a command value adjustment amount with a gain of 0%.

For example, suppose that the user sets the drive mode of the driving assistance subsystem CDM to "Sport mode".

When the driving assistance subsystem LKA is started and the command value V of the driving assistance subsystem LKA becomes larger than 0%, the command value adjusting module 113B outputs a command value adjustment amount such that the drive mode of the driving assistance subsystem CDM is changed from "Sport mode" to "Normal mode" (process 1).

When the command value V of the driving assistance subsystem LKA becomes 0%, the command value adjusting module 113B outputs a command value adjustment amount such that the drive mode of the driving assistance subsystem CDM returns to "Sport mode" (process 2).

Regardless of the command value V of the driving assistance subsystem LKA, the command value adjusting module 113B does not output the command value adjustment amount for adjusting the command value to the driving assistance subsystems DRCC and SATC.

FIG. 14 is a command value adjustment amount output by the command value adjusting module 113B to the driving assistance subsystems CDM, BRC, DRCC, and SATC based on the command value output by the driving assistance subsystem TJA.

The driving assistance subsystem TJA receives the "target steering angle" as a parameter together with the steering request SR1. The command value V output by the driving assistance subsystem TJA is obtained by converting the target steering angle into the current command value for the electric motor 30 and then calculating the moving average of the absolute value to calculate the ratio (%) with the maximum output current. By the above calculation, the displacement of the command value V becomes gentle, and it is possible to prevent the output command value adjustment amount from suddenly fluctuating.

When the command value V of the driving assistance subsystem TJA is 0%, the command value adjusting module 113B gradually increases the output gain of the driving assistance subsystem BRC at 10%/s, and finally outputs a command value adjustment amount with a gain of 100%.

When the command value V of the driving assistance subsystem TJA is larger than 0%, the command value adjusting module 113B gradually decreases the output gain of the driving assistance subsystem BRC at 10%/s, and finally outputs a command value adjustment amount with a gain of 0%.

When the driving assistance subsystem TJA is started and the command value V of the driving assistance subsystem TJA becomes larger than 0%, the command value adjusting module 113B outputs a command value adjustment amount such that the drive mode of the driving assistance subsystem CDM is changed from "Sport mode" to "Normal mode" (process 1).

When the command value V of the driving assistance subsystem TJA becomes 0%, the command value adjusting module 113B outputs a command value adjustment amount so that the drive mode of the driving assistance subsystem CDM returns to "Sport mode" (process 2).

When the command value V of the driving assistance subsystem TJA is within 5%, the command value adjusting module 113B gradually increases the output gain of the driving assistance subsystem DRCC at 10%/s, and finally outputs a command value adjustment amount with a gain of 100%.

When the command value V of the driving assistance subsystem TJA is larger than 5%, the command value adjusting module 113B gradually decreases the output gain of the driving assistance subsystem DRCC at 10%/s, and finally outputs a command value adjustment amount with a gain of 50%.

When the command value V of the driving assistance subsystem TJA is within 10%, the command value adjusting module 113B gradually increases the output gain of the driving assistance subsystem SATC at 10%/s, and finally outputs a command value adjustment amount with a gain of 100%.

When the command value V of the driving assistance subsystem TJA is 20% or less and larger than 10%, the command value adjusting module 113B gradually decreases or gradually increases the output gain of the driving assistance subsystem SATC at 10%/s, and finally outputs a command value adjustment amount with a gain of 50%.

When the command value V of the driving assistance subsystem TJA is larger than 20%, the command value adjusting module 113B gradually decreases the output gain of the driving assistance subsystem SATC at 10%/s, and finally outputs a command value adjustment amount with a gain of 0%.

According to the power steering device 200B of the present embodiment, when adjusting the command value of the driving assistance subsystem 100 of the function belonging to the steering feeling improving function group (second function group), the adjustment method can be set in more detail based on the command value adjustment table. Therefore, the command value can be adjusted in more detail according to the command value output by the function belonging to the automatic driving function group (first function group). Specifically, when the magnitude (absolute value) of the command value output by the function belonging to the automatic driving function group (first function group) is large, the command value of the driving assistance subsystem 100 of the function belonging to the steering feeling improving function group (second function group) is gradually decreased to a smaller value. As a result, in a situation where the output of the function belonging to the automatic driving function group is required, the interference with the function belonging to the automatic driving function group due to the output of the function belonging to the steering feeling improving function group (second function group) can be suppressed. In addition, when the magnitude (absolute value) of the command value output by the function belonging to the automatic driving function group (first function group) is small, since the command value of the driving assistance subsystem 100 of the function belonging to the steering feeling improving function group (second function group) is increased, it is possible to suppress a feeling of steering discomfort. Further, since the adjustment is made using the moving average of the absolute value, the momentary adjustment fluctuation can be suppressed, and the deterioration of the steering feeling can be suppressed.

The target gain, gradual increase rate, and gradual decrease rate shown in Table 6 are examples, and are adjusted from various vehicle tests and the like. Further, the gradual increase rate and the gradual decrease rate may be changed depending on the magnitude (absolute value) of the command value output by the function belonging to the automatic driving function group (first function group). For example, the larger the magnitude (absolute value) of the command value output by the function belonging to the automatic driving function group (first function group), the faster the gradual decrease rate may be set, and the smaller the magnitude (absolute value) of the command value output by the function belonging to the automatic driving function group (first function group), the faster the gradual increase rate may be set.

Although the second embodiment of the present invention has been described in detail with reference to the drawings, the specific configuration is not limited to this embodiment, and includes design changes and the like within a range that does not deviate from the gist of the present invention. In addition, the components shown in the above-described embodiments and modifications can be appropriately combined and configured.
(Modification 1)

For example, the power steering device 200 according to the above embodiment is a column assist type electric power steering device, but the mode of the electric power steering device is not limited to this. The electric power steering device may be a downstream type electric power steering device or a steer-by-wire type electric power steering device. The power steering device can also be applied to a hydraulic power steering device.
(Modification 2)

For example, the power steering device 200 according to the above embodiment has a steering assistance function that controls the drive of the electric motor 30 so that the steering torque Ts becomes smaller from the basic steering request SR0, but the mode of the power steering device is not limited to this. The power steering device may be a steering device that does not have a steering assistance function and is steered by an automatic driving function.

Third Embodiment

A third embodiment of the present invention will be described with reference to the drawings. In the following description, the same reference numerals will be given to the configurations common to those already described, and duplicate description will be omitted. The power steering device 200C according to the third embodiment is different from the first embodiment in that, when the driving assistance subsystem 100 of the function belonging to the steering feeling improvement function group (second function group) is started or stopped, the command value of the driving assistance subsystem 100 of the function belonging to the automatic driving function group (first function group) is adjusted.

The power steering device 200C according to the third embodiment has the same configuration as the power steering device 200 according to the first embodiment, and only a part of the functions of the controller 34 is different from the power steering device 200.

In the third embodiment, the functional block of the controller 34 includes a driving assistance subsystem 100 that receives steering requests (SR1, SR2, SR3) other than the basic steering request SR0, an arbitration module 110C, and a motor control module 120.

The arbitration module 110C includes a priority determination module 111, a start-approval determination module 112, and a command value adjusting module 113C.

Command Value Adjusting Module 113C

In the first embodiment, the command value adjusting module 113 monitors the start/stop status of the driving assistance subsystem 100 of the function belonging to the automatic driving function group (first function group). On the other hand, in the third embodiment, the command value adjusting module 113C monitors the start/stop status of the driving assistance subsystem 100 of the function belonging to the steering feeling improving function group (second function group).

The command value adjusting module 113C outputs a command value adjustment amount based on the command value adjustment table shown in Table 7 with respect to the command value output by the driving assistance subsystem 100 (driving assistance subsystem PA, LKA, TJA).

TABLE 7

| | | | COMMAND VALUE ADJUSTMENT AMOUNT (OUTPUT) FIRST FUNCTION GROUP | | |
|---|---|---|---|---|---|
| | | | P A | L K A | T J A |
| FUNCTION TO BE STARTED (INPUT) | SECOND FUNCTION GROUP | B R C | — | TARGET GAIN 0% GRADUAL DECREASE RATE 50%/s | — |
| | | D R C C | — | — | — |
| | | S A T C | — | — | — |

For example, when the command value of the driving assistance subsystem BRC exceeds the threshold value, or when the moving average of the absolute value of the command value exceeds the threshold value, the command value adjusting module 113C outputs a command value adjustment amount of "gradually decreasing the output gain at 50%/s to a gain of 0%" to the driving assistance subsystem LKA as shown in Table 7. By comparing the moving average of the absolute value of the command value with the threshold value, it is possible to suppress the momentary gradual decrease, and the steering discomfort is reduced.

The command value adjusting module 113C outputs a command value adjustment amount for adjusting the command value of the driving assistance subsystem 100 of the function belonging to the automatic driving function group (first function group), so that the command value output by the driving assistance subsystem 100 of the function belonging to the steering feeling improvement function group (second function group) to be started is prioritized. The command value adjusting module 113C outputs a command value adjustment amount to the driving assistance subsystem LKA so as to "decrease the output gain at 50%/s and finally set the gain to 0%".

When the driving assistance subsystem 100 of the function belonging to the steering feeling improving function group (second function group) is stopped, the command value adjusting module 113C outputs the command value adjustment amount based on the stop command value adjustment table shown in Table 8.

TABLE 8

|  |  |  | COMMAND VALUE ADJUSTMENT AMOUNT (OUTPUT) FIRST FUNCTION GROUP | | |
|---|---|---|---|---|---|
|  |  |  | P A | L K A | T J A |
| FUNCTION TO BE STARTED (INPUT) | SECOND FUNCTION GROUP | B R C | — | TARGET GAIN 100% GRADUAL INCREASE RATE 50%/s | — |
|  |  | D R C C | — | — | — |
|  |  | S A T C | — | — | — |

The stop command value adjustment table has a command value adjustment amount for the driving assistance subsystem 100 (driving assistance subsystems PA, LKA, TJA) of the function belonging to the automatic driving function group (first function group), for each driving assistance subsystem 100 (driving assistance subsystems BRC, DRCC, STAC) of the function belonging to the steering feeling improving function group (second function group) to be stopped.

For example, when the command value of the driving assistance subsystem BRC is equal to or less than the threshold value, or when the moving average of the absolute value of the command value is equal to or less than the threshold value, the command value adjusting module 113C outputs a command value adjustment amount of "gradually increasing the output gain at 50%/s to finally make the gain 100%" to the driving assistance subsystem LKA as shown in Table 8. By comparing the moving average of the absolute value of the command value with the threshold value, the momentary gradual increase can be suppressed and the steering discomfort is reduced.

When the driving assistance subsystem 100 of the function belonging to the steering feeling improvement function group (second function group) is stopped, the command value adjusting module 113C outputs a command value adjustment amount that restores the adjusted command value of the driving assistance subsystem 100 of the function belonging to the automatic driving function group (first function group).

According to the power steering device 200C of the present embodiment, a plurality of driving assistance functions that can be operated at the same time can be operated in a coordinated manner. The functions belonging to the automatic driving function group (first function group) and the steering feeling improving function group (second function group) can be operated in coordination at the same time.

Industrial Applicability

The present invention can be applied to a steering device or the like having a driving assistance function classified into two or more types of functions such as a steering feeling improving function group and an automatic driving function group.

DESCRIPTION OF THE REFERENCE SYMBOLS 200, 200B Power steering device (Steering device)
1 Handle
2 Steering mechanism
20 Steering shaft
29 Torque sensor
3 Steering assistance mechanism
30 Electric motor
31 Reduction mechanism
32 Vehicle speed sensor
34 Controller
35 Motor drive circuit
100 Driving assistance subsystem
101 Start determination module
102 Driving assistance module
103 Command value output module
110, 110B Arbitration module
111 Priority determination module
112 Start-approval determination module
113, 113B Command value adjusting module
120 Motor control module
121 Torque control module
122 Current control module

The invention claimed is:
1. A steering device comprising:
a motor configured to assist or drive a steering; and
a controller configured to control the motor,
wherein the controller is configured to
receive a steering request for a plurality of assistance functions,
select a driving assistance functions to be operated at the same time from the driving assistance functions for which the steering request was made,
generate a command value for the motor for each of the selected driving assistance functions,
adjust the command value based on a combination of the selected driving assistance functions, and
generate a final command value for the motor using the adjusted command value, and
wherein the controller is further configured to control the motor based on the final command value.
2. The steering device according to claim 1, wherein the plurality of driving assistance functions include first driving assistance functions belonging to a first function group and second driving assistance functions belonging to a second function group, and when selecting the driving assistance functions to be operated at the same time, the controller is configured to select one of the first driving assistance functions based on a priority from the first driving assistance functions belonging to the first function group.

3. The steering device according to claim 2, wherein when selecting the driving assistance functions to be operated at the same time, the controller is configured to select all the second driving assistance functions for which the steering request has been made from the second driving assistance functions belonging to the second function group.

4. The steering device according to claim 2, wherein the controller is configured to
generate a first command value, which is the command value by the selected first driving assistance function,
generate a second command value, which is the command value by the selected second driving assistance function,
adjust the second command value so that the first command value has priority, and
generate the final command value using the first command value and the adjusted second command value.

5. The steering device according to claim 4, wherein the controller is configured to use a moving average value of an absolute value of the first command value when adjusting the second command value.

6. The steering device according to claim 2, wherein the controller is configured to
generate a first command value, which is the command value by the selected first driving assistance function,
generate a second command value, which is the command value by the selected second driving assistance function,
adjust the first command value so that the second command value has priority, and
generate the final command value using the second command value and the adjusted first command value.

7. The steering device according to claim 6, wherein the controller uses a moving average value of an absolute value of the second command value when adjusting the first command value.

8. The steering device according to claim 1, wherein the command value is at least one of a current command value for the motor, a steering torque, a vehicle speed, a steering angle, a steering angular velocity, and a steering angular acceleration.

9. The steering device according to claim 2, wherein the first driving assistance function belonging to the first function group is an automatic driving function, and the second driving assistance function belonging to the second function group is a steering feeling improving function.

10. The steering device according to claim 9, wherein the automatic driving function includes at least one of a parking assistance function, a lane keeping assistance function, and a traffic jam driving assistance function.

11. The steering device according to claim 9, wherein the steering feeling improving function includes at least one of a drive mode switching function, a bank road driving compensation function, a driving track convergence control, and a self-alignment torque compensation.

12. A steering device comprising:
a motor configured to assist or drive a steering; and
a controller configured to control the motor,
wherein the controller is configured to
receive a steering request for a plurality of assistance functions,
select a driving assistance functions to be operated at the same time from the driving assistance functions for which the steering request was made,
calculate a command value for the motor for each of the selected driving assistance functions,
adjust the command value based on a combination of the selected driving assistance functions, and
calculate a final command value for the motor using the adjusted command value,
wherein the plurality of driving assistance functions include first driving assistance functions belonging to a first function group and second driving assistance functions belonging to a second function group, and
wherein, when selecting the driving assistance functions to be operated at the same time, the controller is configured to select one of the first driving assistance functions based on a priority from the first driving assistance functions belonging to the first function group.

13. A steering device comprising:
a motor configured to assist or drive a steering; and
a controller configured to control the motor,
wherein the controller is configured to
receive a steering request for a plurality of assistance functions,
select a driving assistance functions to be operated at the same time from the driving assistance functions for which the steering request was made,
generate a command value for the motor for each of the selected driving assistance functions,
adjust the command value based on a combination of the selected driving assistance functions, and
generate a final command value for the motor using the adjusted command value.

* * * * *